United States Patent
Holmes et al.

(10) Patent No.: US 11,965,732 B2
(45) Date of Patent: Apr. 23, 2024

(54) METHODS AND SENSOR FOR MEASURING STRAIN

(71) Applicant: University of Southampton, Southampton (GB)

(72) Inventors: Christopher Holmes, Southampton (GB); Janice Barton, Southampton (GB); Daniel Bull, Southampton (GB)

(73) Assignee: Touch Netix Limited, Fareham/Hampshire (GB)

( * ) Notice: Subject to any disclaimer, the term of this patent is extended or adjusted under 35 U.S.C. 154(b) by 159 days.

(21) Appl. No.: 17/177,785

(22) Filed: Feb. 17, 2021

(65) Prior Publication Data
US 2022/0260363 A1    Aug. 18, 2022

(51) Int. Cl.
*G01B 11/16* (2006.01)
*G02B 6/124* (2006.01)
(Continued)

(52) U.S. Cl.
CPC .......... *G01B 11/168* (2013.01); *G01B 11/165* (2013.01); *G02B 6/124* (2013.01);
(Continued)

(58) Field of Classification Search
CPC ..... G01B 11/168; G01B 11/165; G01B 11/18; G02B 6/124; G02B 6/13; G02B 2006/12107; G02B 2006/12138
See application file for complete search history.

(56) References Cited

U.S. PATENT DOCUMENTS 4,630,883 A * 12/1986 Taylor .................... G02B 6/125
                                                    385/47
5,589,931 A * 12/1996 Rapoport ................ G01L 1/241
                                                    73/800
(Continued)

FOREIGN PATENT DOCUMENTS

DE            60022232 T2 *   6/2006   ......... G02B 6/12004

OTHER PUBLICATIONS

C. Holmes et al., "Bend Monitoring and Refractive Index Sensing using Flat Fiber and Multicore Bragg gratings," Meas. Sci. Technol., pp. 1-6, vol. 31, No. 085203, 2020.
(Continued)

*Primary Examiner* — Mohamed K Amara
(74) *Attorney, Agent, or Firm* — Renner, Otto, Boisselle & Sklar, LLP

(57) ABSTRACT

A method of measuring strain includes providing laminated material having ply layers, and a thickness along a direction orthogonal to the ply layers, and a strain sensor embedded between adjacent ply layers, wherein: the strain sensor includes first and second planar optical waveguide, each of the waveguides having a waveguiding core defining an optical propagation direction parallel to the laminated material and a Bragg grating in the waveguiding core, the optical propagation directions of the optical waveguides being non-parallel; interrogating the first optical waveguide Bragg grating with transverse electric (TE) and transverse magnetic (TM) polarized light, to obtain a TE spectral response and a TM spectral response; interrogating the second optical waveguide Bragg grating with TE and TM polarized light to obtain a TE spectral response and a TM spectral response; and processing the TE spectral responses and the TM spectral responses to extract a through-thickness component of strain.

20 Claims, 7 Drawing Sheets

(51) Int. Cl.
*G02B 6/13* (2006.01)
*G02B 6/12* (2006.01)

(52) U.S. Cl.
CPC ...... *G02B 6/13* (2013.01); *G02B 2006/12107* (2013.01); *G02B 2006/12138* (2013.01)

(56) References Cited

U.S. PATENT DOCUMENTS

| | | | | |
|---|---|---|---|---|
| 6,185,020 | B1* | 2/2001 | Horiuchi | H04B 10/07 398/31 |
| 6,343,171 | B1* | 1/2002 | Yoshimura | H01L 23/5389 385/24 |
| 6,571,027 | B2* | 5/2003 | Cooper | G02B 6/29319 385/12 |
| 6,611,635 | B1* | 8/2003 | Yoshimura | H01L 24/96 257/E25.032 |
| 6,690,845 | B1* | 2/2004 | Yoshimura | G02B 6/124 257/E25.032 |
| 6,845,184 | B1* | 1/2005 | Yoshimura | H01L 23/48 385/9 |
| 7,068,868 | B1* | 6/2006 | Pi | G02B 6/2826 385/12 |
| 7,085,452 | B1* | 8/2006 | Lin | G02B 6/4215 374/E11.015 |
| 7,400,804 | B1* | 7/2008 | Di Teodoro | H01S 3/06754 385/114 |
| 8,538,207 | B2* | 9/2013 | Gates | G01N 21/774 264/1.24 |
| 11,650,423 | B2* | 5/2023 | Messer | G02B 6/0076 359/630 |
| 2002/0028045 | A1* | 3/2002 | Yoshimura | H01L 23/5389 385/39 |
| 2002/0039464 | A1* | 4/2002 | Yoshimura | H01L 24/24 257/E25.032 |
| 2002/0097962 | A1* | 7/2002 | Yoshimura | G02B 6/124 385/16 |
| 2003/0003734 | A1* | 1/2003 | Delwala | G02B 6/1228 438/689 |
| 2003/0085344 | A1* | 5/2003 | Shu | G01B 11/18 374/E11.015 |
| 2003/0126930 | A1* | 7/2003 | De La Puente | G01B 11/18 73/800 |
| 2005/0100297 | A1* | 5/2005 | Hamada | B82Y 20/00 385/129 |
| 2005/0232532 | A1* | 10/2005 | Wang | G01L 1/246 385/13 |
| 2007/0098323 | A1* | 5/2007 | Pi | G01L 11/025 385/27 |
| 2008/0138013 | A1* | 6/2008 | Parriaux | G02B 5/32 385/37 |
| 2009/0041405 | A1* | 2/2009 | Dai | G01N 21/4133 385/12 |
| 2010/0300209 | A1* | 12/2010 | Kreuzer | G02B 6/02209 156/60 |
| 2011/0085773 | A1* | 4/2011 | Kim | G02B 6/122 427/163.2 |
| 2011/0181376 | A1* | 7/2011 | Vanhille | H03H 7/42 333/26 |
| 2012/0200532 | A1* | 8/2012 | Powell | G06F 3/04144 345/175 |
| 2014/0112615 | A1* | 4/2014 | Kreger | G02B 6/4405 385/13 |
| 2015/0091875 | A1* | 4/2015 | Li | G01B 11/14 385/13 |
| 2015/0125111 | A1* | 5/2015 | Orcutt | G02B 6/122 438/701 |
| 2015/0141843 | A1* | 5/2015 | Eberle | G01H 9/004 600/478 |
| 2015/0219848 | A1* | 8/2015 | Schade | G02B 6/107 156/272.8 |
| 2015/0247971 | A1* | 9/2015 | Wertsberger | G02B 6/12002 427/163.2 |
| 2016/0047976 | A1* | 2/2016 | Schade | G01D 5/35387 385/12 |
| 2017/0075064 | A1* | 3/2017 | Docter | G01D 5/35316 |
| 2017/0205578 | A1* | 7/2017 | Van Thourhout | G02B 6/2726 |
| 2020/0212286 | A1* | 7/2020 | Ishii | H01L 41/0815 |
| 2020/0400886 | A1* | 12/2020 | Xu | G01B 11/16 |
| 2022/0032530 | A1* | 2/2022 | Stadlober | G01L 9/0041 |

OTHER PUBLICATIONS

F. Rafiq et al., "Direct UV Written Optical Waveguides in Flexible Glass Flat Fiber Chips," IEEE Journal Sel. Top. Quantum Electron., vol. 18, No. 5, pp. 1534-1539, 2012.

X. Zhang et al., "Monitoring the failure forms of a composite laminate system by using panda polarization maintaining fiber Bragg gratings," Opt. Express, vol. 27, No. 13, pp. 17571-17580, 2019.

J. S. Sirkis, "Unified approach to phase-strain-temperature models for smart structure interferometric optical fiber sensors: part 1, development," Opt. Eng., vol. 32, No. 4, p. 752, 1993.

X. Roselló-Mechó, M. Delgado-Pinar, A. Díez, and M. V. Andrés, "Measurement of Pockels' coefficients and demonstration of the anisotropy of the elasto-optic effect in optical fibers under axial strain," Opt. Lett., vol. 41, No. 13, p. 2934, 2016.

S. Geiger et al., "Flexible and Stretchable Photonics: The Next Stretch of Opportunities," ACS Photonics, vol. 7, No. 10, pp. 2618-2635, 2020.

G. Macrelli, A. K. Varshneya, and J. C. Mauro, "Ultra-thin glass as a substrate for flexible photonics," Opt. Mater. (Amst)., vol. 106, No. May, p. 109994, 2020.

J. Missinne et al., "Bragg-grating-based photonic strain and temperature sensor foils realized using imprinting and operating at very near infrared wavelengths," Sensors (Switzerland), vol. 18, No. 8, pp. 1-14. 2018.

J. Hu, L. Li, H. Lin, p. Zhang, W. Zhou, and Z. Ma, "Flexible integrated photonics: where materials, mechanics and optics meet [Invited]," Opt. Mater. Express, vol. 3, No. 9, p. 1313, Aug. 2013.

L. Li et al., "Monolithically integrated stretchable photonics," Light Sci. Appl., vol. 7, No. 2, p. 17138, 2018.

L. Li et al., "A new twist on glass: A brittle material enabling flexible integrated photonics," Int. J. Appl. Glas. Sci., vol. 8, No. 1, pp. 61-68, 2017.

L. Ll et al., "Integrated flexible chalcogenide glass photonic devices," Nat. Photonics, vol. 8, No. 8, pp. 643-649, 2014.

L. Fan, L. T. Varghese, Y. Xuan, J. Wang, B. Niu, and M. Qi, "Direct fabrication of silicon photonic devices on a flexible platform and its application for strain sensing," Opt. Express, vol. 20, No. 18, p. 20564, 2012.

\* cited by examiner

METHODS AND SENSOR FOR MEASURING STRAIN

BACKGROUND OF THE INVENTION

The present invention relates to methods and a sensor for the measurement of strain.

The detection and measurement of strain is an important capability in a range of sectors. Of particular interest is strain measurement in laminated materials, where new materials comprise advanced composite constructions of layers of different materials. These laminated structures are precisely engineered in order to provide particular structural properties, and these properties can be compromised if a material becomes damaged, as can occur if the material is subjected to unintended strain or which can manifest as increased strain within the material. The various layers may become detached from one another, for example, thereby damaging the overall integrity of the laminated composite.

Therefore, monitoring and measurement of strain in laminated materials is of interest, for both long term structural health monitoring of items made from these materials, such as aircraft wings and wind turbine blades, and for quality assessment during manufacture of the materials and the items. Various techniques are available. In order to provide a detailed picture of strain throughout an item made from a laminated material, one or more sensors can be embedded within the laminated composite, but this can introduce problems. Existing techniques include electronic methods and optical methods. Electronic methods typically pass electrical current through a conductive material and detect changes in electrical resistance and voltage that arise from applied strain and damage. A common example is the metal foil gauge sensor which can measure strain at discrete locations, but is typically placed on a surface rather than being embedded in a material. Other approaches have suggested the deliberate introduction of conductive elements in the form of nanoparticles, nanotubes and carbon fibers into the material(s) of laminated structures by which the electrical measurements can be made.

Optical methods are immune to issues arising from electrical conductivity, and electromagnetic interference in general. Some approaches utilize optical fibers embedded within a laminated material, and rely on the detection of optical parameters which are modified in the presence of strain such as the reflectivity of a Bragg grating or the level of Rayleigh or Brillioun scattering. Discrete and distributed strain sensing is possible, and optical fibers can be interrogated via long-distance optical networks to enable remote monitoring.

However, the various electronic and optical techniques proposed to date are limited to strain measurement along the directions lying within the plane of the laminated structure. Measurement along the orthogonal direction, being the direction of the thickness of the laminated composite material (perpendicular to the ply layers forming the laminate structure), is not attainable. This is a significant issue since the detection of strain along this out-of-plane direction can reveal particular structural defects, such as delamination (separation of the plies) which can cause catastrophic failure, and more generally give a better overall understanding of the structural behavior of a composite material item under loading conditions, that is, during use. Existing methods may infer delamination from in-plane strain measurements, which can have poor accuracy.

Accordingly, improvements to strain measurement techniques in laminated materials are of particular interest.

SUMMARY OF THE INVENTION

Aspects and embodiments are set out in the appended claims.

According to a first aspect of certain embodiments described herein, there is provided a method of measuring strain comprising: providing laminated material comprising two or more ply layers and having a thickness along a direction orthogonal to a plane defined by the ply layers, and comprising a strain sensor embedded between adjacent ply layers, wherein: the strain sensor comprises a first planar optical waveguide and a second planar optical waveguide, each of the first planar optical waveguide and the second planar optical waveguide having a waveguiding core defining an optical propagation direction parallel to the plane of the laminated material and a Bragg grating in the waveguiding core, the optical propagation direction of the first planar optical waveguide being non-parallel to the optical propagation direction of the second planar waveguide; interrogating the Bragg grating of the first planar optical waveguide with transverse electric (TE) polarized light and with transverse magnetic (TM) polarized light to obtain a TE spectral response of the Bragg grating for the TE polarized light and a TM spectral response of the Bragg grating for the TM polarized light; interrogating the Bragg grating of the second planar optical waveguide with TE polarized light and with TM polarized light to obtain a TE spectral response of the Bragg grating for the TE polarized light and a TM spectral response of the Bragg grating for the TM polarized light; and processing the TE spectral response and the TM spectral response of the first planar optical waveguide and the TE spectral response and the TM spectral response of the second planar optical waveguide to extract at least a through-thickness component of strain within the laminated material which is aligned along the direction of the thickness of the laminated material.

According to a second aspect of certain embodiments described herein, there is provided a method of fabricating laminated material comprising: providing two or more ply layers arranged in a stack according to an intended configuration for a laminated material; inserting between an adjacent pair of the ply layers a strain sensor comprising a first planar optical waveguide and a second planar optical waveguide, each of the first planar optical waveguide and the second planar optical waveguide having a waveguiding core defining an optical propagation direction parallel to the plane of the laminated material and a Bragg grating in the waveguiding core, the optical propagation direction of the first planar optical waveguide being non-parallel to the optical propagation direction of the second planar waveguide; and bonding the ply layers together to form the intended configuration for the laminated material with the strain sensor embedded within.

According to a third aspect of certain embodiments described herein, there is provided a strain sensor for embedding within a laminated material, comprising: a first planar optical waveguide having a first waveguiding core defining a first optical propagation direction, a first Bragg grating in the first waveguiding core, and a first thickness orthogonal to the first optical propagation direction; a second planar optical waveguide having a second waveguiding core defining a second optical propagation direction, a second Bragg grating in the second waveguiding core, and a second thickness orthogonal to the second optical propagation direction; the first optical propagation direction being non-parallel to the second optical propagation direction; and optical fibers coupled to the first waveguiding core and the second waveguiding core for optical interrogation of the first Bragg grating and the second Bragg grating.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods and sensors may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
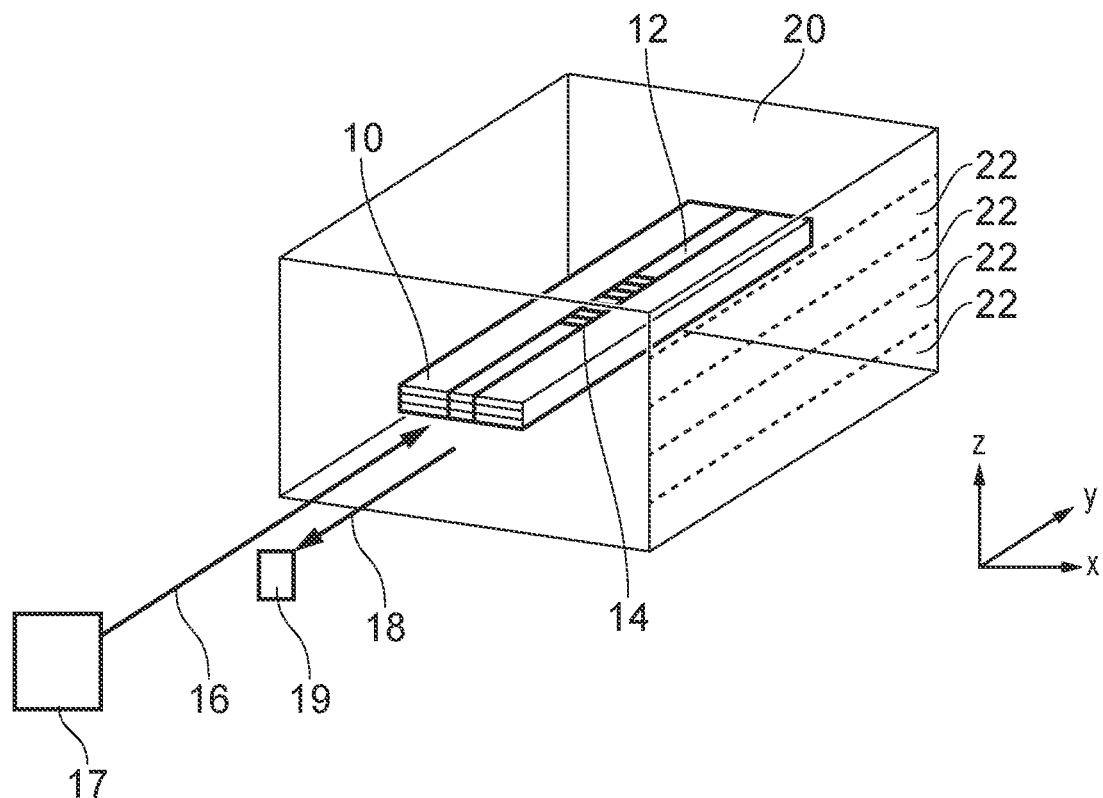
FIG. 1 shows a perspective view of a planar optical waveguide embedded in laminated material to illustrate a principle of the present disclosure.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of methods and devices discussed herein which are not described in detail may be implemented in accordance with any conventional techniques for implementing such aspects and features.

The present disclosure proposes an approach that allows strain measurement along three perpendicular (orthogonal) directions within a laminated material, where, most significantly, one of the directions is the so-called out-of-plane or through-thickness direction, which lies along the thickness direction of the laminated material. Strain along the remaining two orthogonal directions, lying in the plane of the laminated material (in-plane directions), can be detected or measured at the same time if desired. Triaxial strain sensing is thereby enabled.

Herein, the terms "laminated material" or "laminate material" refers to a material made up of two or more layers or plies arranged in a stack according to an intended design or configuration, and bonded together to provide a unitary material. The layers may be layers of two or more different materials, or individual layers may comprise two or more different materials, in which case the laminated material is a composite laminate or composite laminated material. Examples of composite laminates are carbon fiber reinforced polymer (CFRP), glass-fiber reinforced polymer (GFRP), "prepreg" (a reinforcing fabric pre-impregnated with a resin system such as epoxy), and other resin flow materials. In other cases all layers may comprise the same material. The layers may have directional properties, and be stacked so that the properties are oriented along different directions in order to tailor the overall properties of the laminate material. The strain measurement is achieved via one or more sensors which are embedded within the laminated material, positioned between two layers. The proposed approach is applicable to all laminated material types.

The strain monitoring may be carried out in laminated material per se, in other words, an unspecified piece or sample of laminated material, or a laminated material as it is being manufactured. Also, the strain monitoring may be carried out in a specific item, element or component that has been or is being manufactured from a laminated material. As used herein, the terms "laminated material" and "laminate material" may be used to refer to the material itself, and also to items made from such material. Examples of items include aircraft wings and parts thereof, such as spars, and wind turbines and parts thereof, such as blades.

The ability to monitor, detect and measure strain in this way offers substantial benefits. At present, composite laminate materials and items or components made from these materials are typically significantly over-engineered to account for uncertainties arising from the originating modelling or design, and for potential undetected damage that might reduce the load-carrying capability of a component. Inclusion of an embedded strain sensor for triaxial strain measurements allows accurate strain monitoring to be performed over the lifetime of the material so that problems can be detected more reliably and over-engineering can be reduced. This allows the design of lighter components, with associated societal, cost and environmental benefits. For example, lower weight turbine blades in the wind turbine industry can increase the lifespan of turbine bearings, improve the efficiency of energy generation, and reduce installation and maintenance costs. In the aircraft sector, lighter structures can enable fuel savings and payload increases. In general, the provision of through-thickness strain monitoring can reduce laminate material thickness, and thereby enable leaner materials and components.

The presently-disclosed concept is an optical method of strain sensing, utilising Bragg gratings in optical waveguides, the monitoring of which is an established technique for strain measurement. A Bragg grating has a grating pitch defined by the period of a sequence of regions of alternating refractive index along a waveguiding core (in an optical fiber or a planar waveguide), which acts to reflect incident light at a wavelength or wavelengths determined by the periodic structure; this is the spectral response of the grating. Light propagating in a waveguide in which a Bragg grating is present undergoes some reflection from the grating if it has a wavelength within the grating's spectral response, and this reflected light can be detected and monitored. If the grating experiences strain, the grating pitch is physically altered which in turn modifies the spectral response. Hence, a change in the detected reflected light can indicate a change in the strain conditions at the location of the grating (where other factors that can act to alter the grating pitch, such as temperature, can also change the reflection). It is thereby possible to measure, monitor or detect strain or a change in strain using a Bragg grating in an optical waveguide as a sensor. Typically, Bragg gratings are formed inside optical fibers for this purpose.

According to the present disclosure, however, Bragg gratings are formed inside planar optical waveguides. By planar, it is meant that the waveguide is an element which has a thickness which is very much less than its width, where the thickness and width are orthogonal dimensions which are both perpendicular to the direction of light propagation along the grating. The planar optical waveguide is a photonics device comprising, along the thickness direction, layers of optical material of differing refractive index. It may be formed from deposited optical layers defining upper and lower cladding layers and a core defined in an intermediate core layer; this structure may be referred to as a waveguiding chip (an integrated optical chip), or it may comprise a flattened or planarized optical fiber or "flat fiber", formed by collapsing a fiber preform into a planar shape before drawing the fiber [1, 2]. In either case, the planar optical waveguide has a thin, flat external configuration, as defined by its outer dimensions. The thickness of the planar optical waveguide is about 50 µm or less, such as 30 µm or less. In contrast, the width of the planar optical waveguide may be at least an order of magnitude larger than the thickness, for example, 0.5 mm or more, or 1 mm or more.

The core of the waveguide is configured with an asymmetry aligned with the external dimensions of the planar optical waveguide. The asymmetry provides birefringence, so that the two orthogonal polarizations of light propagating along the core, the transverse electric (TE) and the transverse magnetic (TM) polarizations experience different propagating conditions along the core, and hence interact differently with the Bragg grating. This allows the two polarizations to be distinguished from each other in light comprising the response from the Bragg grating, so the grating can be interrogated individually using the two polarizations. The asymmetry may be provided by an asymmetric physical transverse cross-section for the waveguiding core, for example the core has a thickness less than its width, which echoes the external planar dimensions of the planar waveguide. The core cross-section may be rectangular or oval, for example. Alternatively, the asymmetry may be provided in the refractive index profile of the core, such that in the transverse cross-section, the refractive index has a different profile parallel to the waveguide thickness from the profile parallel to the waveguide width. In this case, the thickness and width of the core may be the same or similar (so the core is circular or square), or may be unequal (so the core is rectangular or oval). In a further alternative, the birefringence may arise from both the core shape and the core refractive index profile.

The planar geometry of the optical waveguide, and the asymmetry of the core combine to enable use of the planar optical waveguide for the presently proposed strain measurement technique. The asymmetric core configuration means that the two orthogonal polarizations of propagating light, the transverse electric (TE) and the transverse magnetic (TM) polarizations, have fixed orientations (which are orthogonal to the propagation direction) for light propagating along the waveguide. The external asymmetric shape of the planar waveguide corresponds to the polarization orientation, and the thin flat configuration allows the planar waveguide to be inserted or stacked between two layers or plies of a laminated material with minimal disruption to the laminate structure. This aligns the polarization directions to the orientation of the laminate plies, to give one polarization with an electric field parallel to the plane of the plies and magnetic field orthogonal to the thickness of the laminated material (an in-plane polarization), and one polarization with an electric field parallel to the material thickness and magnetic field orthogonal to the plane of the plies (an out-of-plane or through-thickness polarization). Since the planar waveguide is fixed or embedded within the laminated material, this polarization orientation is inherently locked to the material geometry. The polarization orientation of light propagating in the planar waveguide is always known. Interrogation of the planar waveguide via one or other polarization therefore allows interrogation of a property of the laminated material, such as strain, in a manner that contains directional information. A sufficient number of measurements can be decoupled to obtain resolved strain information aligned along the perpendicular directions of the laminated material (two in-plane directions and one through-thickness direction)—triaxial measurement.

This is challenging and impractical to achieve with known optical methods that use optical fiber. Polarization-maintaining (PM) optical fiber has been suggested [3], but the axis of polarization for a PM optical fiber typically changes along its length with respect to the geometry of a laminated material in which the optical fiber is embedded, with little control over setting this, and the use of a posteriori calibration not always feasible in typical composite structures. This is true even for D-shaped optical fiber. This makes it difficult to embed optical fiber with any specified orientation; it is free to roll and change rotational position during the dynamic nature of curing used in the lamination process.

FIG. 1 shows a schematic perspective view (not to scale) of a planar optical waveguide embedded in a laminated material. The planar optical waveguide 10, in the form of a chip, comprises a core layer between an upper cladding layer and a lower cladding layer, in the usual manner. A waveguiding core 12 is formed within the core layer, and a Bragg grating 14 is defined within the core 12. In this example the core 12 has a rectangular transverse cross-section to provide the asymmetry for distinguishing the two polarization states. The planar optical waveguide 10 is embedded between two adjacent layers or plies 22 of a laminated material 20. Orthogonal xyz axes can be defined, as depicted, so that the planes of the plies 22 and the plane of the waveguide 10 are in an x-y plane, and the thickness of the laminated material 20 and the thickness of the waveguide 10 lie along the z direction. The waveguiding core 12 is oriented along the y direction. In order to interrogate the Bragg grating 14, an optical source 17 emits light 16 of a wavelength matching (within, overlapping, including or corresponding to) the spectral response of the Bragg grating 14, which is launched into the waveguiding core 12 for propagation along the y direction. Light 18 reflected from the grating 14 back-propagates (−y direction) and is emitted from the waveguiding core 12 and detected by an optical detector 19, from which any shift in the response of the grating 14 caused by factors including strain experienced by the laminated material 20 can be determined, and a value of the strain potentially determined. A Bragg grating may also be interrogated in transmission, where light transmitted by the grating (which is the inverse of the reflected light) continues to propagate in the forward or +y direction along the core 12 for emission and detection. Either or both configurations may be employed to implement the present concept. Conveniently, optical fiber (not shown) may be used to carry light and couple light into and out of the waveguiding core 12.

Figure 2:
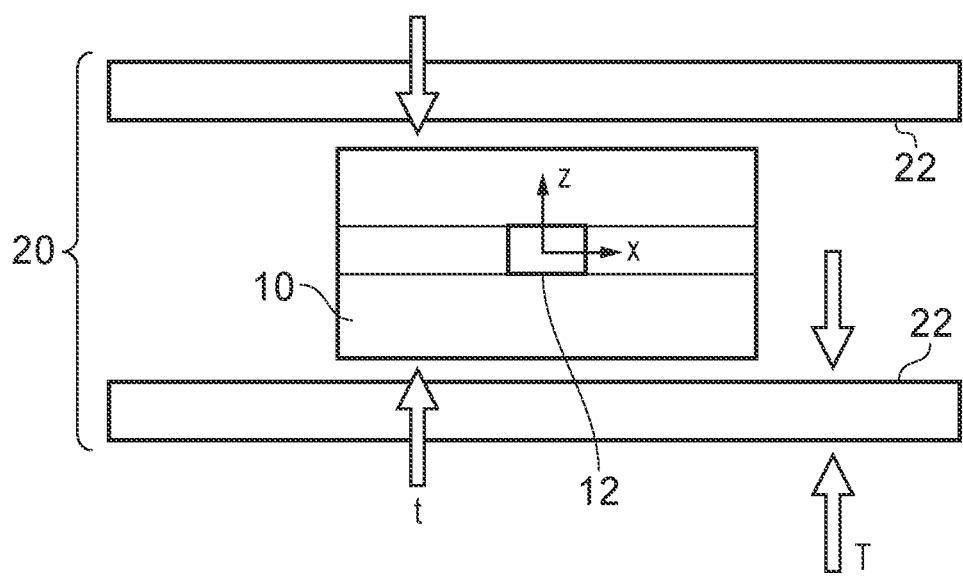
FIG. 2 shows a side view of a planar optical waveguide embedded in laminated material to illustrate a principle of the present disclosure.

FIG. 2 shows a cross-sectional view (not to scale) through the planar optical waveguide 10 embedded between two layers 22 of the laminated material 20, in a through-thickness plane perpendicular to the direction of optical propagation y along which the core 12 is aligned, in other words the x-z plane. The planar waveguide chip 10 has a thickness t in the z-direction which as previously noted is typically not more than 50 μm. In contrast, the plies 22 may each have a thickness T of about 300 μm, although this is an example only and other layer thicknesses T may be used. However, note that the waveguide chip 10 can have a thickness considerably less than the ply thickness, in this example, six times less. The waveguide chip 10, being thinner than the plies 22 of the laminated material 20, can hence be integrated into the laminated material with minimal disruption to the layered structure and reduced formation of stress concentrations. This can be contrasted with existing optical strain sensors which may have a typically much greater thickness such as 125 μm. The layers 22 are bonded together with resin or adhesive (not shown).

The proposed decoupling of directional components of strain in a laminated material uses the principle that the TE and TM optical polarizations can travel at different speeds (observe different effective refractive indices, n, because the material in which they propagate is birefringent) depending upon the strain to which a body, in this case a Bragg grating in a planar optical waveguide, is subjected. The spectral responses (change in birefringence) of the grating, Δλ, are influenced by the linear strain components, $\varepsilon_x$, $\varepsilon_y$ and $\varepsilon_z$, along the x, y and z directions respectively, because the strain distorts the grating. For light propagating along the y axis (modal propagation direction) and polarized (alignment of the electric field in space, either TE or TM polarization) along the x and z axes (i.e. in-plane and through-thickness), the spectral responses Δλ/λ are defined as [4]:

$$\frac{\Delta\lambda_x}{\lambda_x} = \varepsilon_y - \frac{n_x^2}{2}(p_{11}\varepsilon_x + p_{12}(\varepsilon_y + \varepsilon_z)) + \eta_x\Delta T \quad \#(1)$$

$$\frac{\Delta\lambda_z}{\lambda_z} = \varepsilon_y - \frac{n_z^2}{2}(p_{11}\varepsilon_z + p_{12}(\varepsilon_y + \varepsilon_x)) + \eta_z\Delta T \quad \#(2)$$

where the first term on the right hand side relates to a physical length change in grating pitch caused by the strain, the second term is the strain-optic response dependent upon the Pockels coefficients $p_{11}$ and $p_{12}$ which are properties of the waveguide material, and the third term is the thermal response dependent upon the thermo-optic constant η and change in temperature ΔT (since a change in temperature also distorts the grating and alters the spectral response). For a silica waveguide, where silica is a common material for waveguides and optical fiber, the Pockels coefficients $p_{11}$ and $p_{12}$ can be known or estimated. For example, they are 0.121 and 0.270 respectively for fused silica, with recent estimated values for SMF-28 optical fiber being closer to 0.116 and 0.255 respectively (at a wavelength of 1531 nm) [5]. The wavelength and refractive index subscripts relate to the respective alignment of the electric field in space, that is to say, TE or TM polarization. That the embedding of the planar waveguide within a laminate, as illustrated in FIGS. 1 and 2, enables decoupling of strain components can be made by noting the inherent alignment of the TE and TM modes to the laminate geometry, achieved by the above-noted locking of the waveguide geometry to that of the laminate.

From equations #(1) and #(2) it can be seen that the change in spectral birefringence of the planar waveguide is dominated by the second term. Assuming the thermo-optic response and effective refractive indices are comparable for both polarizations, the difference in birefringence can be approximated by:

$$(\Delta\lambda_x - \Delta\lambda_z) \approx \gamma(\varepsilon_x - \varepsilon_z) \quad \#(3)$$

where γ is a constant, dependent upon the photoelastic parameters of the waveguide, which for silica glass has a positive value. For a single planar Bragg grating, as illustrated in FIG. 1, the strain difference (right-hand side of equation #(3)) between the through-thickness strain component $\varepsilon_z$ and orthogonal in-plane strain component $\varepsilon_x$ can be inferred through the change in birefringence (left-hand side of equation #(3)). Since we can measure the change in birefringence by interrogating the Bragg grating with both the TE and TM polarizations, we can obtain information about the through-thickness strain component (z direction) and the in-plane strain component along the x-direction. These are the orthogonal strain components in the plane perpendicular to the optical propagation direction along which the waveguiding core and the Bragg grating lie.

However, it will be appreciated from equation #(3) that the two strain components are coupled together. In order to resolve this, and allow the strain along different directions, and in particular along the though-thickness direction, to be determined separately, it is proposed to use a second planar Bragg grating in a second waveguiding core of a second planar optical waveguide, embedded in the laminate material so as to be oriented perpendicular to the first planar Bragg grating (from FIG. 1). In other words, the waveguiding core is oriented for optical propagation along the x direction, with the TE and TM polarization orientations lying along the y direction and the z direction.

From equation #(3), if the subscripts for the direction x are replaced with the direction y, it will be apparent that the second waveguide can provide information about the through-thickness strain component (z direction) coupled to the in-plane strain component along the y-direction.

Hence, we can gather coupled data about all three linear strain components by making measurements on two orthogonally arranged planar waveguides with Bragg gratings at both the TE and TM polarizations. Suitable processing can decouple the strain components. Two waveguides each interrogated with two polarizations gives a set of four simultaneous equations, namely equations #(1) and #(2) for each waveguide. The set of simultaneous equations has four unknown terms comprising the three strain components (one for each direction x, y and z) and a temperature component, and can be expressed as follows:

$$\begin{pmatrix} V_{TE} \\ V_{TM} \\ H_{TE} \\ H_{TM} \end{pmatrix} = \begin{bmatrix} -\frac{n^2}{2}p_{11} & \left(1-\frac{n^2}{2}p_{12}\right) & -\frac{n^2}{2}p_{12} & \eta_{V_{TE}} \\ -\frac{n^2}{2}p_{12} & \left(1-\frac{n^2}{2}p_{12}\right) & -\frac{n^2}{2}p_{11} & \eta_{V_{TM}} \\ \left(1-\frac{n^2}{2}p_{12}\right) & -\frac{n^2}{2}p_{11} & -\frac{n^2}{2}p_{12} & \eta_{H_{TE}} \\ \left(1-\frac{n^2}{2}p_{12}\right) & -\frac{n^2}{2}p_{12} & -\frac{n^2}{2}p_{11} & \eta_{H_{TM}} \end{bmatrix} \begin{pmatrix} \varepsilon_x \\ \varepsilon_y \\ \varepsilon_z \\ \Delta T \end{pmatrix} \quad \#(4)$$

where V and H indicate the two waveguides, and correspond to the normalised spectral response, $\Delta\lambda/\lambda$, for light propagating in waveguides aligned for optical propagation along the y axis and the x axis respectively. It can be assumed that the TE and TM effective refractive indices are comparable, for the waveguides aligned along the y axis (i.e. $n_x$ and $n_z$) and x axis (i.e. $n_y'$ and $n_z'$) respectively. That is to say, $n \approx n_x \approx n_z \approx n_y' \approx n_z'$. Through use of equation 4, it is possible to decouple linear strain and temperature. Hence, values for strain along each of three orthogonal directions, namely the through-thickness direction and the two in-plane directions can be obtained, allowing strain to be mapped or monitored in three dimensions through a laminated material.

Figure 3:
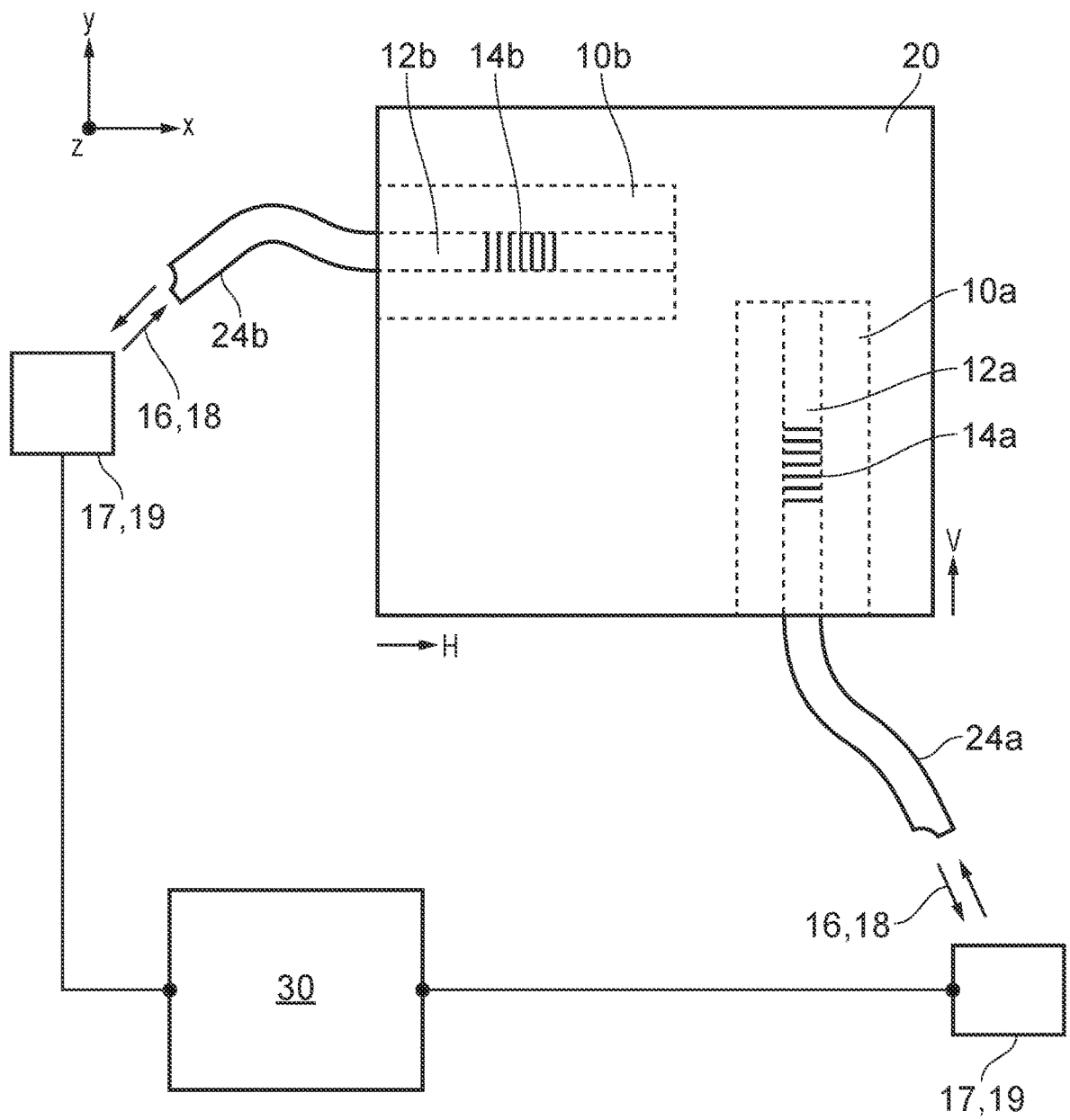
FIG. 3 shows a schematic representation of planar optical waveguides embedded in a sample of laminated material to provide a strain sensor according to an example of the present disclosure, together with related components forming a system for measuring strain according to an example of the present disclosure.

FIG. 3 shows a plan view of a laminated material item, element, or component configured for strain measurement or monitoring in this way. The laminated material 20 has a thickness along the z direction, and has a first planar optical waveguide strain gauge 10a embedded in it (hence shown in phantom), having a Bragg grating 14a in its core 12a as described above. The core 12a is aligned along the y axis. This can be considered to correspond to the waveguide V in equation #4 (merely because it is depicted with a vertical alignment in FIG. 3). A second planar optical waveguide strain gauge 10b is embedded in a perpendicular arrangement so that its core 12b with a Bragg grating 14b is aligned along the x axis. This can be considered to correspond to the waveguide H in equation #4 (merely because it is depicted with a horizontal alignment in FIG. 3). The two planar waveguides can be thought of a single sensor, with three dimension strain resolution.

The planar waveguides 10a and 10b are shown as two separate elements. Alternatively, the waveguides may both be formed as a single element, for example by defining both the two perpendicular cores with Bragg gratings in a single core layer of a fabricated chip comprising the core layer between two cladding layers. This can allow for ease of mounting the strain sensor inside a laminate structure. Only one element needs to be inserted and aligned, and the two waveguides already have the correct perpendicular alignment relative to one another if accurately defined. It may be simpler and more accurate to form two waveguiding cores with the proper relative alignment into the same chip than to achieve accurate alignment when installing two separate chips in a laminated material. Also, the two waveguides may more easily be arranged in close physical proximity so as to more accurately monitor strain at a same location in the laminated material. A direct ultraviolet laser writing process may be used to form the waveguiding cores and the Bragg gratings. It is possible to write a core and its grating simultaneously in a single writing step, which is fast and ensures good alignment of the grating within the core.

However, the core and the grating may be written separately, or formed by other processes which will be apparent to the person skilled in the art.

Also, each waveguide may contain a single Bragg grating. Alternatively, two or more waveguides may be defined along the length of the waveguiding core, for example with different spectral responses. This can allow improved results, for example by averaging measurements from each grating, or may expand the usefulness of the sensor by allowing it to operate over a wider range of wavelengths.

In this example each planar waveguide 10a, 10b is provided with an optical fiber 24a, 24b optically coupled to the waveguiding core 12a, 12b to launch light into the waveguide and receive light reflected from the Bragg grating. The optical fiber is polarization-maintaining fiber in order to achieve the required interrogation at both the TE and TM polarizations. For ease of coupling and assembly, in this example the planar waveguides 10a, 10b are situated at the edges of the laminated material 20 so that the waveguiding cores 12a, 12b can be accessed for coupling to the optical fibers 24a, 24b after formation of the laminate material 20. For practical purposes, it is likely that a sensor will be embedded far from an edge, however. In this case, optical fiber can be coupled to a planar waveguide to form a unitary optical component, which can be inserted as a single item between layers of the laminated material 20 with the optical fiber connecting the waveguiding core with its Bragg grating to an edge of the laminated material for optical access. In still other examples, the planar waveguides may comprise flat fiber rather than layered chips, in which case there may be no need for other optical fiber to communicate with the embedded waveguides; the flat fiber itself can carry light to and from the Bragg grating. More practically, conventional cylindrical fiber may be used to couple to and from the flat fiber since it will be more flexible under any in-plane bending of the laminated material. A separate portion of flat fiber will be required for each waveguide in a single sensor, requiring appropriate relative alignment when installing the fibers in the laminated material.

As described above, light 16, 18 is input to and detected from each planar waveguide 10a, 10b, generated from and detected by any suitable arrangement of optical source and optical detector 17, 19 (shown indicated schematically as a single unit per waveguide in FIG. 3). A single optical source and a single optical detector may be used to service both waveguides if appropriate directing of the light is implemented. The input light may comprise separately launched TE and TM polarized light, but unpolarized light may alternatively be used for interrogation if the birefringence of the waveguiding cores is sufficient to divide the TE and TM responses from the Bragg grating by a resolvable amount. The detectors 19 at least are connected to a controller or processor 30 which receives a signal from each detector 19 indicating the detected light, and implements processing (via suitable software programming, for example) to solve Equation #(4) above and extract an indication or value for at least the though-thickness strain component, and preferably all three strain components along x, y and z. Depending on requirements, actual values of strain may be measured or determined, or a change in strain (difference or change from an original level or a some previous level, for example) may be determined, or merely monitored. For example, the controller 30 may have pre-set thresholds for any or all of the strain components or a change in strain, and is operable to compare determined absolute or relative values of strain with a threshold and provide an alert or notification if a threshold is exceeded.

The controller 30 may also be connected with the optical sources 17, and configured to cause the optical sources 17 to emit light when strain monitoring, measuring or detection is required. Any optical wavelength (visible, infrared, ultraviolet) may be used, but should be selected with reference to wavelengths able to propagate without substantial loss along the planar waveguide, and which fall within the spectral response of the Bragg grating. A short or ultrashort pulse of light may be emitted, for ease of temporally resolving the reflected light for more enhanced detection. A time domain modulation scheme may be employed to separate the emitted light and the detected light, where two interrogations, one for each polarization, are needed for each measurement event. The controller 30 may also operate polarizing and filtering components (not shown) in order to provide the appropriate polarization of input light for each measurement in configurations where unpolarized input light is not used, and to extract the appropriate polarization from the detected light returned from the gratings if not otherwise distinguishable.

According to the above examples and the described mathematical theory, the two waveguiding cores with Bragg gratings that make up the strain sensor are arranged perpendicular to one another in the in-plane direction. This orthogonal arrangement will optimize the measurements which can be obtained using the sensor, but is not essential, however. In reality, any non-zero angle between the propagation directions of the two waveguiding cores will yield an indication of triaxial strain, including the through-thickness strain. A larger angle, closer to 90°, may be used as preferred, for more accurate results. Therefore, in general terms, the two waveguiding cores are arranged so as to be non-parallel in the plane of the sensor, in other words, the cores may have an angular separation greater than 0°, for example, in the range 45° to 90°, or in the range 70° to 90°, or in the range 80° to 90°, or in the range 85° to 90°, or substantially 90° (orthogonal or perpendicular).

It is beneficial if an embedded strain sensor does not significantly affect the performance and characteristics of the laminated material in which it is embedded. This can be achieved by use of a suitably thin sensor. Herein, the thickness of the planar optical waveguide, or sensor thickness, is the external thickness dimension of the complete waveguiding structure, including core or core layer, cladding or cladding layer, and any additional elements that may be included such as a fiber coating layer or a chip substrate layer. As noted above, waveguide thicknesses of 50 µm or less, for example around 30 µm, or less than 30 µm, are useful for not disrupting the structure of the laminate material, which may have layers each with thicknesses about ten times larger than the waveguide thickness, so on the scale of 100 µm to 1000 µm (although other thicknesses may be used). Experiments have been performed in order to demonstrate this and other characteristics of strain sensors as described herein.

Figure 4:
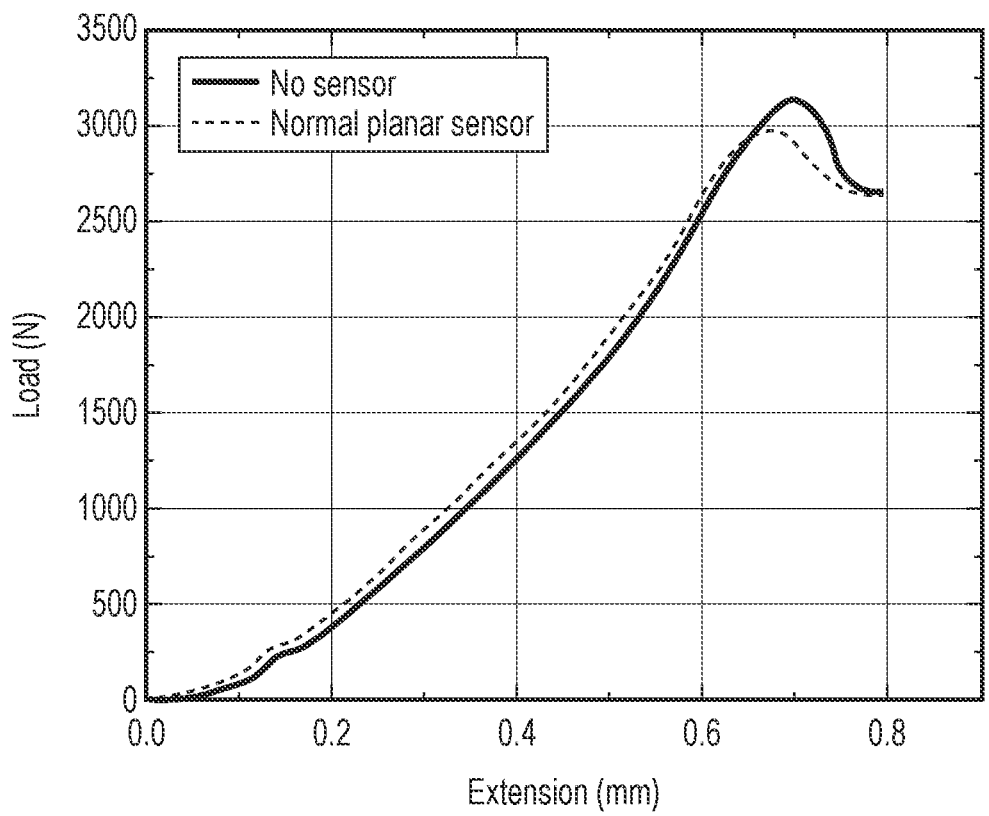
FIG. 4 shows two graphs of extension versus applied load data measured for samples of laminated material with and without embedded planar optical waveguides according to an example of the present disclosure.
Figure 4:
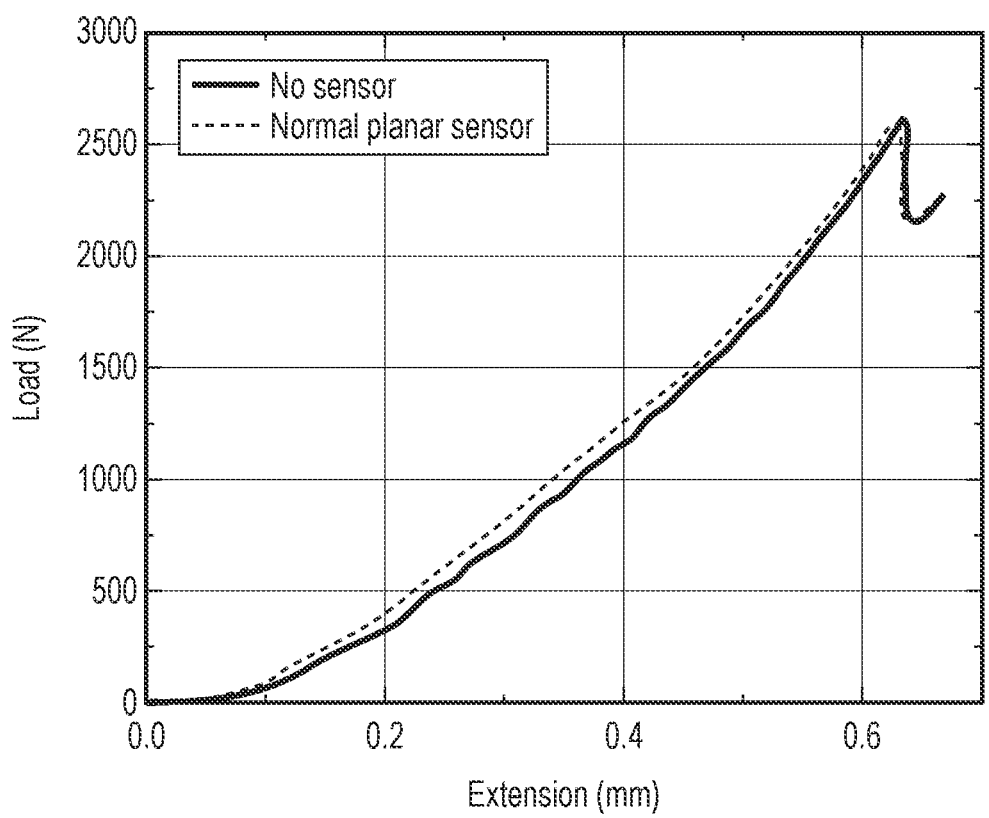

FIG. 4 shows graphs of measured extension against an applied load for samples of the same laminated materials having no strain sensor (solid lines) and having an embedded planar sensor according to the disclosure (dotted lines). From this it can be appreciated that the extension caused to the laminated materials by an applied load is very similar both with and without the load, indicating that the presence of the sensor is not detrimental to performance of the laminated material, and failure mechanisms and occurrences are comparable with un-sensored laminated material.

For the experiments, planar silica waveguides in chip format were fabricated; further details of the fabrication method, which is an example only and does not limit the configuration and format of the strain sensors which may be used to make measurements according to the invention, are discussed later. Each planar waveguide was provided with four Bragg gratings (configured as Gaussian apodized Bragg gratings) placed end-to-end along the waveguiding core, and having different spectral responses separated by 50 nm. While more than one Bragg grating per waveguide is not essential, the plurality provided useful data for full assessment. Also, different gratings with well-separated or non-overlapping spectral responses may be used to facilitate TM and TE interrogations at different wavelengths via spectral multiplexing, thereby avoiding a need for polarization maintaining components to handle the reflected light. The Bragg gratings had a length of 12 mm, but other lengths can be used, including lengths less than 12 mm, and indeed 1 mm or less. This shows the option of significant miniaturisation for a sensor, in particular if both waveguides are formed in a single chip, and can further reduce physical effects on the laminated material arising from the presence of one or more sensors. Once made, two chips were embedded into a sample of laminated material, by placing the chips in the required orthogonal orientation for the waveguiding cores between two central layers during the assembly of a 4-ply configuration. In this example, the laminated material was a composite laminate in the form of XPREG (RTM) XC130 epoxy-based unidirectional carbon fiber prepreg. The chips were arranged so that inputs to the waveguiding cores were accessible at edges of the sample, and polarizing-maintaining optical fibers were coupled to the waveguiding cores to deliver and collect the required light. The light was emitted from a 5-element superluminescent light emitting diode broadband source in order to cover the total bandwidth of the four gratings, and detected using an optical spectrum analyser, again to access the full bandwidth. A polarization maintaining polarizer was used to deliver and return the light, with switching of the polarization state between TE and TM polarizations. A 3 dB coupler was used to interface the single optical source and the single optical detector to the two waveguides. Values determined for the four gratings were averaged for each waveguide.

In order to subject the sample to strain, the laminated material sample was held vertically between two electromechanical clamps which were moved apart to apply a tensile force along the vertical direction. The waveguides were oriented within the sample such that one was vertical and one horizontal in this arrangement.

Figure 5A:
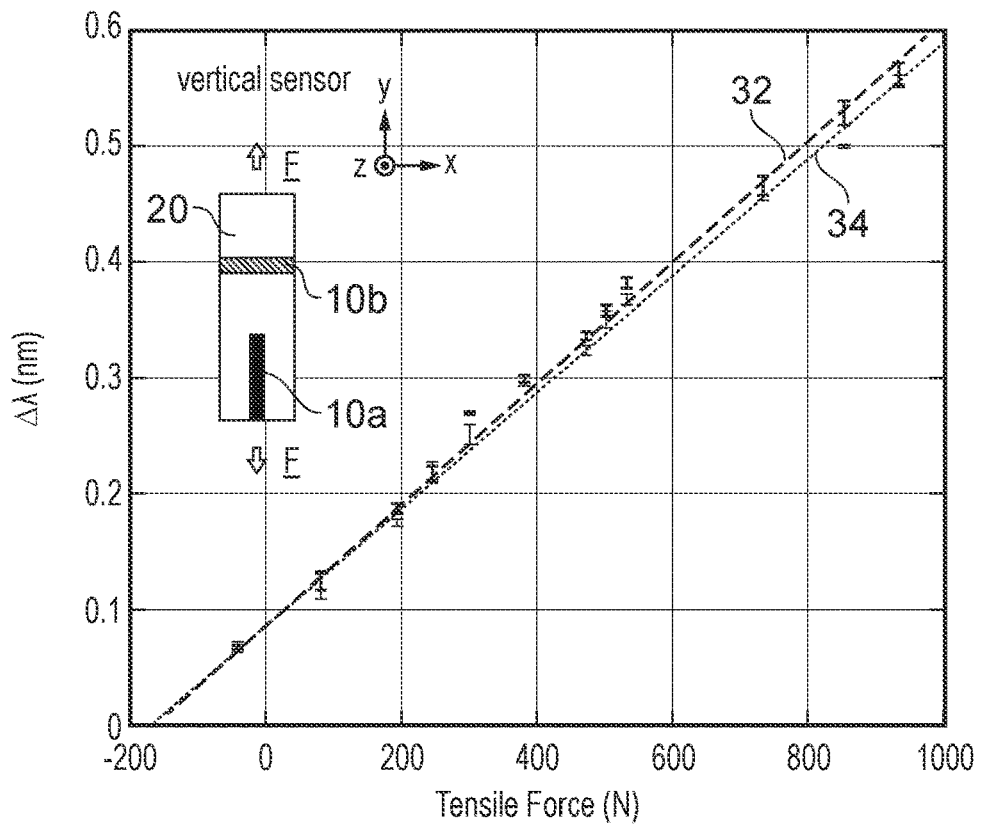
FIGS. 5A and 5B show graphs of spectral responses from, respectively, vertical and horizontal embedded planar optical waveguides, measured for varying forces applied to laminated material in which the planar optical waveguides are embedded according to an example of the present disclosure.
Figure 5B:
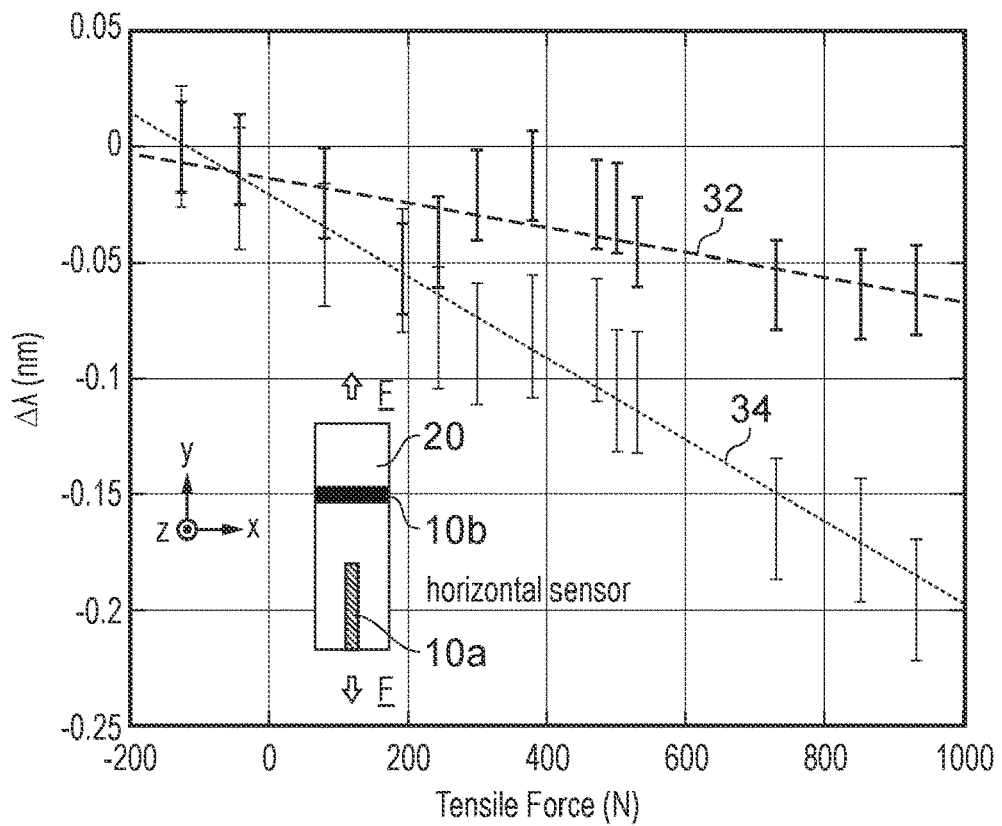

FIG. 5A shows a graph of the measured mean spectral response ($\Delta\lambda$, in nm) from the vertical waveguide against applied tensile force (N), and FIG. 5B shows a graph of the measured mean spectral response ($\Delta\lambda$, in nm) from the horizontal waveguide against applied tensile force (N). Inset diagrams show a schematic of the sample 20 with the embedded waveguides 10a, 10b, and the direction of the force F, together an indication of the assigned x, y and z axes. Hence, within the plane of the sample 20, the vertical direction was along the y-axis and the horizontal direction was along the x-axis, with z being the through-thickness or out-of-plane direction. On each graph, the responses measured for the TE polarization (line 32) and for the TM polarization (line 34) are shown.

As can be seen from these results, the vertical waveguide 10a, in which the waveguiding core, and hence light propagation direction, was oriented with the vertical, y-axis, the direction along which the strain was applied, showed a larger spectral response with applied force than the horizontal sensor 10b. This can be understood from Equation #(1), which has a dominant first term related to strain along the direction of light propagation. Hence, the response of the sensor is as expected. The positive trend of the vertical waveguide results indicates that the vertical waveguide 10a was under tensile strain along the y-axis, as expected. The horizontal waveguide 10b had light propagating along the x-axis. The smaller negative gradients of the results for this waveguide indicate compressive strain along the x-axis, which is smaller in magnitude than the strain in the z-axis, also as expected (the TE polarization measurements being smaller than the TM polarization measurements). As the strain components along both the x-axis and z-axis (the through-thickness direction) are under compression, for $(\Delta\lambda_{TE}-\Delta\lambda_{TM})$ to be positive for the vertical sensor, the magnitude of through-thickness strain must be greater than that of the in-plane strain (i.e. $|\varepsilon_z|>|\varepsilon_x|$), understood from Equation (3). Therefore, from graphical inspection, it can be inferred that $|\varepsilon_y|>|\varepsilon_z|>|\varepsilon_x|$, as expected.

Figure 6:
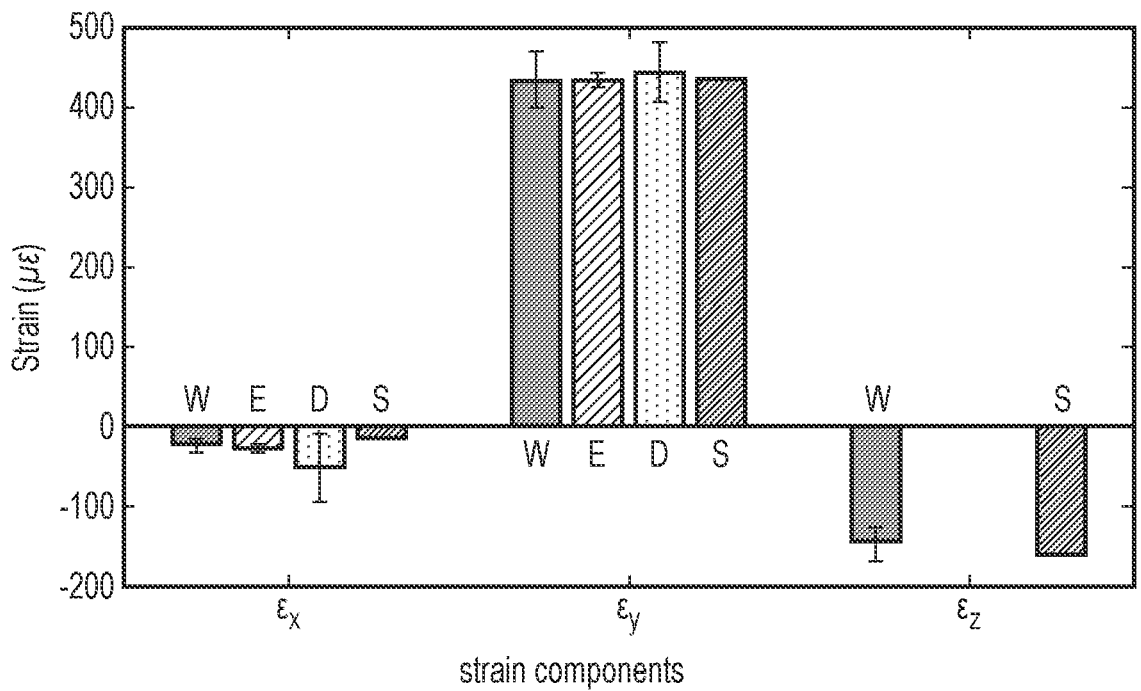
FIG. 6 shows a bar chart of strain components calculated from the spectral response data of FIGS. 5A and 5B, together with strain components determined by other techniques.

FIG. 6 shows a bar chart of values for the three strain components $\varepsilon_x$, $\varepsilon_y$ and $\varepsilon_z$ calculated from the spectral response measurements shown in FIGS. 5A and 5B, using Equation #(4) and the Nelder-Mead numerical method with weighted fitting. The bars indicated as "W" (waveguide) show these results. Also included in FIG. 6 are results obtained using alternative strain measurements techniques: an electric strain gauge ("E") and digital image correlation or DIC ("D"), for the purposes of comparison. Finally, values obtained from a mathematical simulation using finite element analysis ("S") are also shown. As can be seen, $|\varepsilon_y|>|\varepsilon_z|>|\varepsilon_x|$, in line with the inference from FIGS. 5A and 5B noted above. Also, the waveguide sensor shows good agreement with the other measurement techniques and the simulation for the in-plane values, $\varepsilon_x$ and $\varepsilon_y$. Significantly, the through-thickness value $\varepsilon_z$ shows good agreement with the simulation, whereas it is not possible to make through-thickness strain measurements using electric strain gauge or DIC. Accordingly, the presently proposed method can provide accurate strain measurements for all three dimensions in a laminated material.

Figure 7:
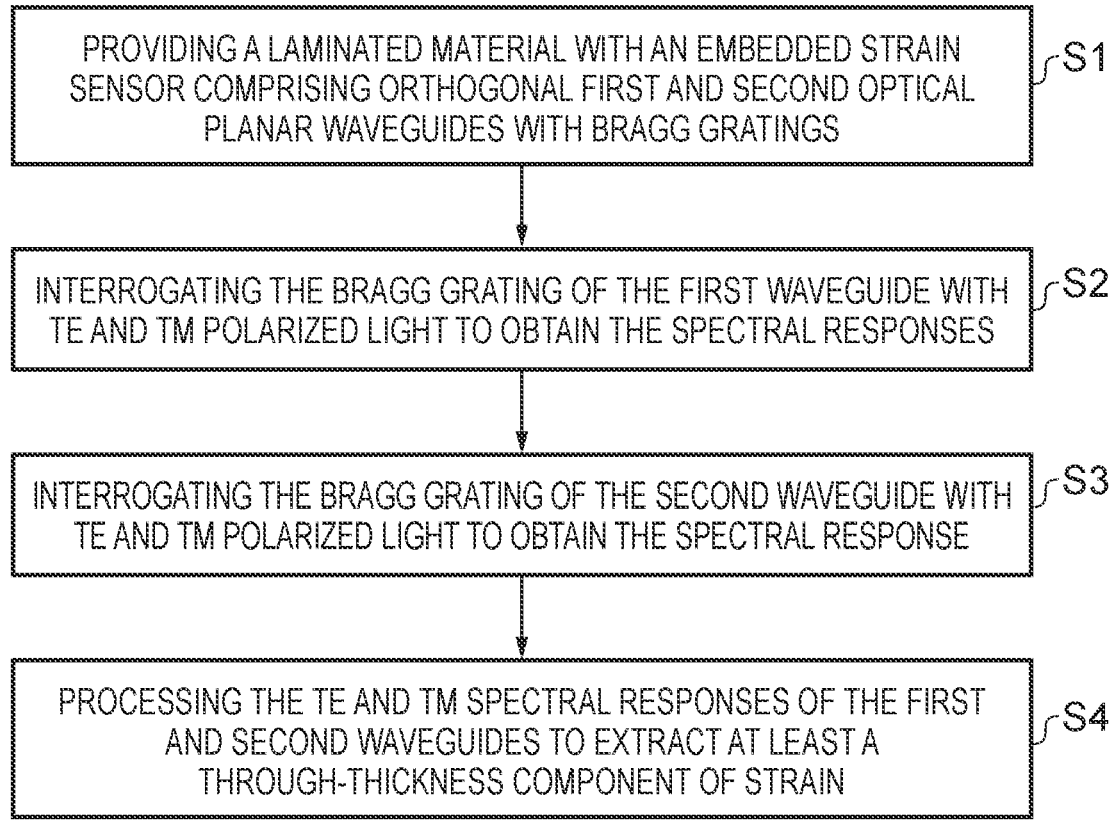
FIG. 7 shows a flow chart of steps in an example method of strain measurement according to the present disclosure.

FIG. 7 shows a flow chart of steps in an example method of strain measurement according to the present disclosure. In a first step S1, a laminated material is provided, having embedded within a strain sensor comprising two orthogonally arranged (or, more generally, non-parallel) planar optical waveguides with Bragg gratings in their waveguiding cores, as previously described. In a second step S2, the Bragg grating in a first of the two planar optical waveguides is interrogated with both TE and TM polarized light, and light that has interacted with the grating, that is, has been reflected or transmitted by the grating, is detected, as representing the current spectral response of the grating, which will be subject to current strain conditions in the laminated material so that the spectral response includes stain information. In a third step S3, the interrogation with both TE and TM light is repeated for the Bragg grating in the second of the two planar optical waveguides. In a final step S4, one or more components of the strain in the laminated material are extracted from the TE and TM spectral responses from the two planar optical waveguides. This is possible by following equation #4 noted above, for example, which allows the orthogonal components of the strain to be decoupled and extracted from the recorded spectral data. In particular, the through-thickness strain component is determined, being the strain along the direction of the thickness of the laminated material. The two orthogonal strain components lying in the plane of the laminated material may also be extracted if required.

The method may be carried out in installed laminated material items and components during use to monitor up to all three orthogonal components of strain, with the results being usable in computer models to predict faults and failures in the material. The sensors can operate at high temperatures if required, and additionally be used to measure temperature changes (since a temperature change also alters the spectral response of a Bragg grating). Also, monitoring and/or measurement can be performed during the process of manufacturing or fabricating laminated material, by including sensors between two layers at an early stage of assembly. Such monitoring of triaxial strains during fabrication can determine internal stresses in the material, which can be useful for predictive modelling, in addition to enabling quality monitoring and fault or flaw identification for the manufacturing process.

If a chip format is selected for the waveguides, either as two separate layered chips each having a waveguiding core, or as two waveguiding cores defined in the core layer of a single chip, the waveguide may usefully be formed from silica. However, other materials are not excluded, for example, other glasses and polymers can also be used as optical materials, and formed as planar optical thin films in the same manner as silica in order to define the required cladding layers and core layer. While there is a requirement for thinness of the waveguides, as mentioned above, the waveguides may also be in a flexible format that can withstand mechanical deformation. This avoids or reduces damage to a waveguide when the surrounding laminated material distorts under strain, either in use or when being formed into a curved item. Flexibility can be achieved by the use of flexible integrated photonics, a term used to refer to photonic devices, such as waveguides, fabricated on flexible substrates [6-13]. The substrates may be polymer material, or chalcogenide, silica or other glass materials, for example; these latter can be implanted with ions for additional strength.

An example technique for fabrication of a silicon chip waveguide will now be described, that is suitable for producing a sufficiently thin waveguide, with a thickness in the order of tens of micrometers. This example uses lithography compatible silica-photonics, with processing that has been demonstrated upon planar silica-on-silicon wafers. Other silica planar waveguide variants are feasible (including flat fiber), but are not inherently compatible with lithographic approaches.

Silica-on-silicon structures can be fabricated through flame hydrolysis deposition (FHD), although other glass depositions techniques are possible separately or alongside FHD, including but not limited to plasma-enhanced chemical vapor deposition (PECVD) and thermal oxide growth on silicon. The silicon provides a 'sacrificial' substrate layer which is removed after the waveguide is formed; other substrate materials such as sapphire and fused silica may also be used. Ideally, the substrate is made from a material that is conducive to machining, such as silicon, and able to tolerate the conditions experienced during material deposition.

Figure 8:
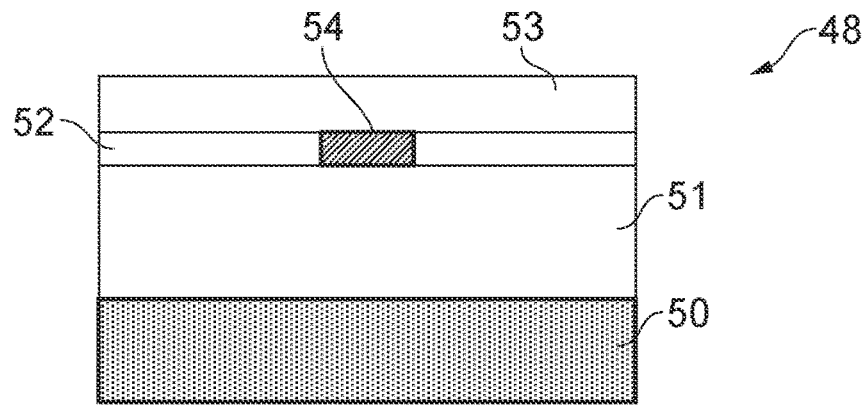
FIG. 8 shows a cross-sectional side view of a planar optical waveguide formed on a substrate according to an example of the present disclosure.

FIG. 8 shows a schematic side view of a fabricated waveguide. The waveguide 48 comprises a sacrificial silicon substrate 50, a thick silica undercladding layer 51 overlying the substrate 50, a doped silica core layer 52 overlying the undercladding layer 51, a doped silica overcladding layer 53 overlying the core layer 52, and a waveguiding core 54 (shown end-on, looking along the propagation direction) of higher refractive index formed in the core layer 52 by a technique such as ultraviolet beam writing. The sacrificial substrate 50 is present to provide a base on which the waveguiding layers are built up during the deposition process, and is then removed in order to achieve a sufficiently thin and flexible optical device. Preferably, negligible stress differentials are present between the glass layers, primarily the overcladding layer 53 and the undercladding layer 51. Significant stress differential results in curvature of the glass elements once delaminated from the sacrificial silicon substrate 50, which will be described shortly. Stresses can be minimised by the layers being compositionally equivalent. Various processing upon the layered structure (integrated optics), such as defining waveguides, Bragg gratings, and any other optical arrangements required for propagating light such as cross-couplers, etc. are defined prior to the removal of the sacrificial substrate 50. It should be noted that the undercladding layer 51 can be thicker than the overcladding layer 53 which may be configured to provide just enough thickness for approximate evanescent field encapsulation. Hence, the undercladding layer 51 may be purposefully thicker than it needs to be in order for optical operation, this permits it partially be removed along with the sacrificial substrate.

Figure 9:
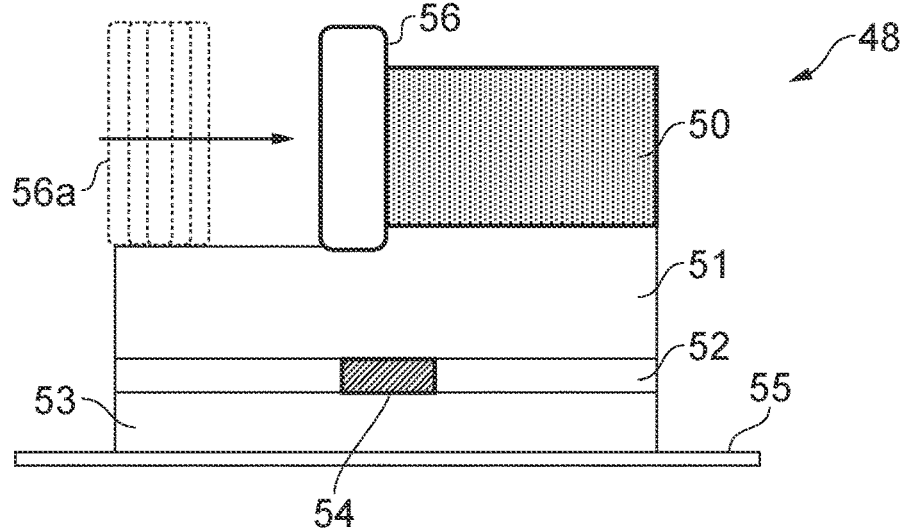
FIG. 9 shows the planar optical waveguide of FIG. 8 with the substrate partially removed, as a cross-sectional side view.

FIG. 9 shows a schematic side view of the waveguide 48 of FIG. 8 undergoing a single stage process for removal of the sacrificial substrate 50. Layer-by-layer removal of silicon is feasible using a dicing saw. The waveguide 48 or chip is inverted and placed face-down (overcladding layer 54 lowermost) upon adhesive tape 55. A diamond impregnated resin blade 56 of moderate kerf (250 µm) is be used to successively remove material from the underside of the chip; repeated cuts 56a are made starting at an end of the chip and progressing towards the other end (indicted by the arrow). The blade 56 should have sufficiently small diamond grit size, as larger diameter grits may detrimentally damage the remaining glass material. Fine grits above #800, with 5 mm/s translation speed on a 77 mm diameter blade rotating at 25 krpm gave superior results in terms of speed and quality of finish. Note, the period of successive dicing (width of sideways movement of the blade from one cut to the next) can be less than the kerf of the dicing blade 56 to limit surface feature formation attributable to the blade's form. Note the removal of a portion of the undercladding layer 51 together with the sacrificial substrate 50; this ensures total removal of the sacrificial substrate 50 and is accounted for by the extra thickness for the undercladding layer 51 noted above. This gradual removal of the sacrificial substrate takes account of the large stresses that typically exist between silicon and silica. Incrementally reducing the thickness of the whole sacrificial substrate may have detrimental results; when the silica and silicon thickness become comparable in thickness, mechanical failure is more probable. Noted that other physical machining techniques may be used, including, but not limited to, lapping, laser ablating, wet etching and plasma dry etching.

Silica planar photonics are compatible with standard optical fiber. Monolithic integration of the fiber to a planar waveguide could be achieved through fusion splicing, embedding with FHD or use of a high temperature epoxy, for example. Depending upon the method of adhesion, optical fiber could be coupled to the core of the planar waveguide either prior or post substrate removal.

Once fabricated, with a suitable thickness such as less than 50 µm and having a generally rectangular cross-section with a constant thickness, the planar waveguide can be directly embedded into laminated material to form a strain sensor. However, the shape of the planar waveguide, while being very thin and therefore impacting very little on the structure of the laminated material, may still introduce some effects.

Figure 10:
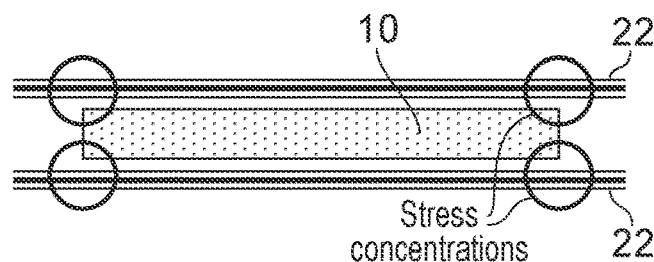
FIG. 10 shows a cross-sectional side view of one example of a planar optical waveguide embedded in laminated material according to the present disclosure.

FIG. 10 shows a schematic side view of a planar waveguide 10 embedded between two layers 22 of a laminated material (which may include additional layers above and/or below the planar waveguide 10). The corners of the planar waveguide, being abrupt edges, can introduce regions of concentrated stress into the laminated structure.

In order to address this, in some examples it is proposed to manipulate the cross-sectional shape of a waveguiding chip in order to remove or minimise abrupt edges. For example, the thickness of the chip may be reduced towards its edges in a smooth and gradual manner, and/or the corners may be rounded, in order to provide a curved cross-sectional profile without sharp corners.

Figure 11:
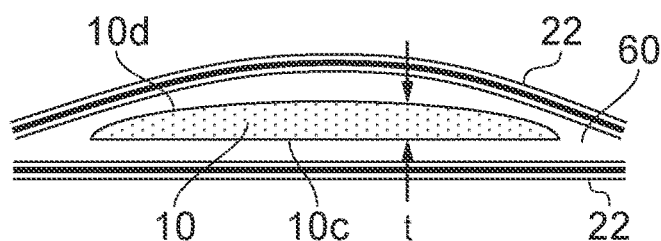
FIG. 11 shows a cross-sectional side view of another example of a planar optical waveguide embedded in laminated material according to the present disclosure.

FIG. 11 shows a schematic side view of an embedded planar waveguide 10 which has been modified in this way. The thickness t of the waveguide chip has been reduced gradually towards the edges of the chip to provide a smooth tapered cross-section. Shaping of this kind can also improve the flow of resin 60 used to bond the laminate layers together, reducing the likelihood of empty pockets and avoiding the larger resin-rich regions that would be present adjacent to a rectangular chip holding the laminate layers 22 further apart. Such regions are associated with induced mechanical weakness, particularly for embedded optical fiber, so are preferably avoided if possible.

The use of flat fiber instead of a waveguide chip also addresses this issue, since the cross-sectional profile is inherently smooth and rounded, lacking sharp and abrupt edges and corners. Additionally, it is possible to machine the collapsed preform for a flat fiber, to achieve a desired profile which can be tailored in accordance with the noted issue.

Other modifications can be made to the external shape of a planar waveguide to tailor it for mechanical and fabrication advantage. For example, the upper and/or lower surfaces of the chip, which present a large surface area to the adjacent ply layers of the laminated material, can be provided with surface roughening. This provides three-dimensional surface features, such as indentations and protrusions, that improve keying of the waveguide chip 10 with the resin 60 used to bound the laminate layers together, and hence enhance the structural integrity. For example, the upper and lower faces 10c and 10d of the planar waveguide 10 in FIG. 11 may be treated in this way.

Figure 12:
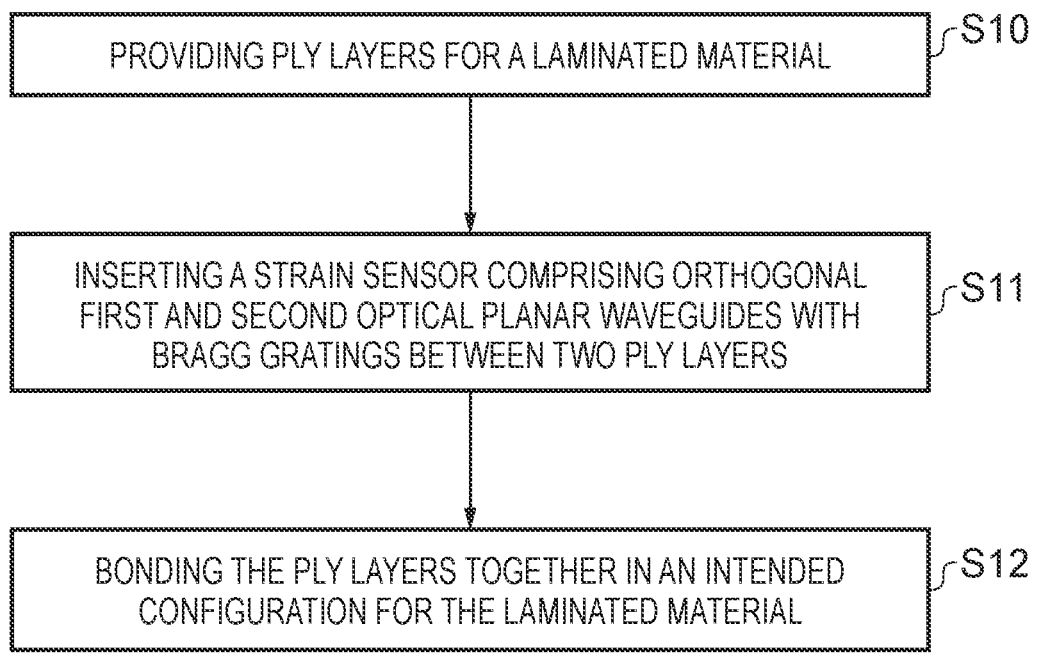
FIG. 12 shows a flow chart of steps in an example method of fabricating laminated material according to the present disclosure.

FIG. 12 shows a flow chart of steps in an example method for fabricating laminated material configured for strain monitoring or measuring as disclosed herein. In a first step S10, ply layers for a laminated material are provided, comprising at least two ply layers that are to be arranged in an intended layered configuration to form a laminated material. In a next step S11, a strain sensor, comprising two orthogonal planar optical waveguides with Bragg gratings, is inserted between two adjacent ply layers, at a location where it is desired to measure or monitor strain in the completed laminated material (or an item made from the laminated material). In a final step S3, the ply layers are bonded together to form the laminated material, having the intended configuration and the strain sensor embedded within ready for use to monitor or measure strain in the laminated material.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] C. Holmes et al., "Bend Monitoring and Refractive Index Sensing using Flat Fiber and Multicore Bragg gratings," Meas. Sci. Technol., vol. 31, no. 085203, pp. 1-6, 2020.
[2] F. Rafiq et al., "Direct UV Written Optical Waveguides in Flexible Glass Flat Fiber Chips," IEEE Journal Sel. Top. Quantum Electron., vol. 18, no. 5, pp. 1534-1539, 2012.
[3] X. Zhang et al., "Monitoring the failure forms of a composite laminate system by using panda polarization maintaining fiber Bragg gratings," Opt. Express, vol. 27, no. 13, pp. 17571-17580, 2019.
[4] J. S. Sirkis, "Unified approach to phase-strain-temperature models for smart structure interferometric optical fiber sensors: part 1, development," Opt. Eng., vol. 32, no. 4, p. 752, 1993.
[5] X. Roselló-Mechó, M. Delgado-Pinar, A. Díez, and M. V. Andrés, "Measurement of Pockels' coefficients and demonstration of the anisotropy of the elasto-optic effect in optical fibers under axial strain," Opt. Lett., vol. 41, no. 13, p. 2934, 2016.
[6] S. Geiger et al., "Flexible and Stretchable Photonics: The Next Stretch of Opportunities," ACS Photonics, vol. 7, no. 10, pp. 2618-2635, 2020.
[7] G. Macrelli, A. K. Varshneya, and J. C. Mauro, "Ultra-thin glass as a substrate for flexible photonics," Opt. Mater. (Amst)., vol. 106, no. May, p. 109994, 2020.
[8] J. Missinne et al., "Bragg-grating-based photonic strain and temperature sensor foils realized using imprinting and operating at very near infrared wavelengths," Sensors (Switzerland), vol. 18, no. 8, pp. 1-14, 2018.
[9] J. Hu, L. Li, H. Lin, P. Zhang, W. Zhou, and Z. Ma, "Flexible integrated photonics: where materials, mechanics and optics meet [Invited]," Opt. Mater. Express, vol. 3, no. 9, p. 1313, Aug. 2013.
[10] L. Li et al., "Monolithically integrated stretchable photonics," Light Sci. Appl., vol. 7, no. 2, p. 17138, 2018.
[11] L. Li et al., "A new twist on glass: A brittle material enabling flexible integrated photonics," Int. J. Appl. Glas. Sci., vol. 8, no. 1, pp. 61-68, 2017.
[12] L. Li et al., "Integrated flexible chalcogenide glass photonic devices," Nat. Photonics, vol. 8, no. 8, pp. 643-649, 2014.
[13] L. Fan, L. T. Varghese, Y. Xuan, J. Wang, B. Niu, and M. Qi, "Direct fabrication of silicon photonic devices on a flexible platform and its application for strain sensing," Opt. Express, vol. 20, no. 18, p. 20564, 2012.

The invention claimed is:

1. A method of measuring strain comprising:
providing laminated material comprising two or more ply layers and having a thickness along a direction orthogonal to a plane defined by the ply layers, and comprising a strain sensor embedded between adjacent ply layers, wherein: the strain sensor comprises a first planar optical waveguide and a second planar optical waveguide, each of the first planar optical waveguide and the second planar optical waveguide having a waveguiding core defining an optical propagation direction parallel to the plane of the laminated material and a Bragg grating in the waveguiding core, and cladding around the waveguiding core, the optical propagation direction of the first planar optical waveguide being non-parallel to the optical propagation direction of the second planar waveguide, and each of the first planar optical waveguide and the second planar optical waveguide having a thickness and a width being orthogonal dimensions perpendicular to the optical propagation direction and the width being at least an order of magnitude larger than the thickness; interrogating the Bragg grating of the first planar optical waveguide with transverse electric (TE) polarized light and with transverse magnetic (TM) polarized light to obtain a TE spectral response of the Bragg grating for the TE polarized light and a TM spectral response of the Bragg grating for the TM polarized light;
interrogating the Bragg grating of the second planar optical waveguide with TE polarized light and with TM polarized light to obtain a TE spectral response of the Bragg grating for the TE polarized light and a TM spectral response of the Bragg grating for the TM polarized light; and
processing the TE spectral response and the TM spectral response of the first planar optical waveguide and the TE spectral response and the TM spectral response of the second planar optical waveguide to extract at least a through-thickness component of strain within the laminated material which is aligned along the direction of the thickness of the laminated material.

2. A method according to claim 1, further comprising extracting two orthogonal in-plane strain components of strain within the laminated material which are parallel to the plane of the laminated material, aligned with the optical propagation directions of the first planar optical waveguide and the second planar waveguide, and orthogonal to the through-thickness strain component.

3. A method according to claim 1, wherein the thickness of the first planar optical waveguide and the thickness of the second planar optical waveguide are each along the direction of the thickness of the laminated material and are 50 μm or less.

4. A method according to claim 1, wherein the first planar optical waveguide and the second planar optical waveguide are each configured as a pho tonic chip comprising a core layer in which the waveguiding core of the optical waveguide is defined between an upper cladding layer of the optical waveguide and a lower cladding layer of the optical waveguide, the upper cladding layer and the lower cladding layer being parts of the cladding around the waveguide core.

5. A method according to claim 1, wherein the first planar optical waveguide and the second planar optical waveguide are configured as a single photonic chip comprising a core layer in which the waveguiding core of the first planar optical waveguide and the waveguiding core of the second planar optical waveguide are both defined, between an upper cladding layer of the first and second optical waveguides and a lower cladding layer of the first and second optical waveguides, the upper cladding layer and the lower cladding layer being parts of the cladding around the waveguide core.

6. A method according to claim 1, wherein the first planar optical waveguide and the second planar optical waveguide are each configured as a flat optical fiber.

7. A method according to claim 1, comprising interrogating the first planar optical waveguide and interrogating the second planar optical waveguide during use of an item fabricated from the laminated material.

8. A method according to claim 1, comprising interrogating the first planar optical waveguide and interrogating the second planar optical waveguide during fabrication of the laminated material.

9. A method according to claim 1, wherein the laminated material is a composite laminated material.

10. A method according to claim 9, wherein the composite laminated material comprises carbon fiber reinforced polymer.

11. A method according to claim 1, wherein the first planar optical waveguide and the second planar optical waveguide comprise silica.

12. A method of fabricating laminated material comprising:
providing two or more ply layers arranged in a stack according to an intended configuration for a laminated material;
inserting between an adjacent pair of the ply layers a strain sensor comprising a first planar optical waveguide and a second planar optical waveguide, each of the first planar optical waveguide and the second planar optical waveguide having a waveguiding core defining an optical propagation direction parallel to the plane of the laminated material and a Bragg grating in the waveguiding core, and cladding around the waveguiding core, the optical propagation direction of the first planar optical waveguide being non-parallel to the optical propagation direction of the second planar waveguide, and each of the first planar optical waveguide and the second planar optical waveguide having a thickness and a width being orthogonal dimensions perpendicular to the optical propagation direction and the width being at least an order of magnitude larger than the thickness; and
bonding the ply layers together to form the intended configuration for the laminated material with the strain sensor embedded within.

13. A method according to claim 12, wherein the first planar optical waveguide and the second planar optical waveguide are each configured as a photonic chip comprising a core layer of the optical waveguide in which the waveguiding core is defined between an upper cladding layer of the optical waveguide and a lower cladding layer of the optical waveguide, the upper cladding layer and the lower cladding layer being parts of the cladding around the waveguide core.

14. A method according to claim 12, wherein the first planar optical waveguide and the second planar optical waveguide are configured as a single photonic chip comprising a core layer in which the waveguiding core of the first planar optical waveguide and the waveguiding core of the second planar optical waveguide are both defined, between an upper cladding layer of the first and second optical waveguides and a lower cladding layer of the first and second optical waveguides, the upper cladding layer and the lower cladding layer being parts of the cladding around the waveguide core.

15. A method of according to claim 12, wherein the first planar optical waveguide and the second planar optical waveguide are each configured as a flat optical fiber.

16. A method according to claim 12, wherein the laminated material is a composite laminated material.

17. A strain sensor for embedding within a laminated material, comprising:
a first planar optical waveguide having a first waveguiding core defining a first optical propagation direction, a first Bragg grating in the first waveguiding core, a first thickness orthogonal to the first optical propagation direction, and a first width orthogonal to the first thickness and to the first optical propagation direction, the first width being at least an order of magnitude larger than the first thickness;
a second planar optical waveguide having a second waveguiding core defining a second optical propagation direction, a second Bragg grating in the second waveguiding core, a second thickness orthogonal to the second optical propagation direction, and a second width orthogonal to the second thickness and to the second optical propagation direction, the second width being at least an order of magnitude larger than the second thickness;
the first optical propagation direction being non-parallel to the second optical propagation direction;
cladding around the first waveguiding core and the second waveguiding core; and
optical fibers coupled to the first waveguiding core and the second waveguiding core for optical interrogation of the first Bragg grating and the second Bragg grating.

18. A strain sensor according to claim 17, wherein the first thickness and the second thickness are 50 μm or less.

19. A strain sensor according to claim 17, wherein the first planar optical waveguide and the second planar optical waveguide are configured as a single photonic chip comprising a core layer in which the first waveguiding core and the second waveguiding core are both defined, between an upper cladding layer of the first and second optical waveguides and a lower cladding layer of the first and second optical waveguides, the upper cladding layer and the lower cladding layer being parts of the cladding around the waveguide core.

20. A strain sensor according to claim 17, wherein the first planar optical waveguide and the second planar optical waveguide are each configured as a flat optical fiber.

* * * * *

UNITED STATES PATENT AND TRADEMARK OFFICE
CERTIFICATE OF CORRECTION

PATENT NO. : 11,965,732 B2
APPLICATION NO. : 17/177785
DATED : April 23, 2024
INVENTOR(S) : Christopher Holmes et al.

Page 1 of 1

It is certified that error appears in the above-identified patent and that said Letters Patent is hereby corrected as shown below:

On the Title Page

Item (73), Assignee reads, "Touch Netix Limited, Fareham/Hampshire"; it should read --University of Southampton, Southampton--.

Signed and Sealed this
Eleventh Day of February, 2025

Coke Morgan Stewart
*Acting Director of the United States Patent and Trademark Office*